United States Patent
Chittella et al.

(10) Patent No.: US 9,544,643 B2
(45) Date of Patent: Jan. 10, 2017

(54) MANAGEMENT OF A SIDELOADED CONTENT

(71) Applicant: Sling Media PVT Ltd, Bangalore (IN)

(72) Inventors: Kiran Chittella, Bangalore (IN); Arunoday Thammineni, Bangalore (IN); Varunkumar Tripathi, Bangalore (IN)

(73) Assignee: Sling Media PVT Ltd, Bangalore (IN)

( * ) Notice: Subject to any disclaimer, the term of this patent is extended or adjusted under 35 U.S.C. 154(b) by 0 days.

(21) Appl. No.: 14/574,538

(22) Filed: Dec. 18, 2014

(65) Prior Publication Data

US 2016/0182947 A1 Jun. 23, 2016

(51) Int. Cl.
| | |
|---|---|
| H04N 7/173 | (2011.01) |
| H04N 21/4402 | (2011.01) |
| H04N 21/41 | (2011.01) |
| H04N 21/433 | (2011.01) |
| H04N 21/436 | (2011.01) |
| H04N 21/845 | (2011.01) |
| H04H 60/80 | (2008.01) |
| H04N 21/2343 | (2011.01) |
| H04N 21/234 | (2011.01) |

(52) U.S. Cl.
CPC ...... *H04N 21/440218* (2013.01); *H04H 60/80* (2013.01); *H04N 21/4126* (2013.01); *H04N 21/433* (2013.01); *H04N 21/436* (2013.01); *H04N 21/440245* (2013.01); *H04N 21/8455* (2013.01); *H04N 21/8456* (2013.01); *H04N 21/234* (2013.01); *H04N 21/234309* (2013.01)

(58) Field of Classification Search
CPC ............... H04N 21/234; H04N 21/234309
USPC ................... 725/109, 110, 112, 116
See application file for complete search history.

(56) References Cited

U.S. PATENT DOCUMENTS

| | | | | |
|---|---|---|---|---|
| 7,712,094 | B2 * | 5/2010 | Shapiro | 717/175 |
| 2008/0160908 | A1 * | 7/2008 | Khedouri et al. | 455/3.06 |
| 2008/0184317 | A1 * | 7/2008 | Khedouri | G06F 17/30094 725/86 |
| 2008/0195664 | A1 * | 8/2008 | Maharajh | G06F 17/30035 |
| 2009/0150409 | A1 * | 6/2009 | Watson et al. | 707/10 |
| 2011/0225417 | A1 * | 9/2011 | Maharajh | G06F 21/10 713/150 |
| 2012/0141092 | A1 * | 6/2012 | Friedman | 386/248 |
| 2013/0166580 | A1 * | 6/2013 | Maharajh | H04L 65/605 707/758 |
| 2015/0237102 | A1 * | 8/2015 | Baccichet | H04L 67/42 709/204 |

* cited by examiner

*Primary Examiner* — Pankaj Kumar
*Assistant Examiner* — Sahar Baig
(74) *Attorney, Agent, or Firm* — Bejin Bieneman PLC (57) ABSTRACT

Media content is downloaded from a remote source. A request is received from a client device for sideloading of the media content. Sideloading of the media content to the client device is begun when the downloading has begun and the request has been received.

16 Claims, 7 Drawing Sheets

MANAGEMENT OF A SIDELOADED CONTENT

BACKGROUND

"Sideloaded" media content is media content such as streaming video or the like that is downloaded to a receiving device, e.g., a set-top box or the like, from a remote server via a network, a broadcast, etc., and then transferred from the receiving device to a second device, sometimes referred to as the end client device. However, downloaded media content may be provided to the receiving device in a format unsuitable for viewing on the end client device. Unfortunately, present mechanisms for converting a format of downloaded media content and sideloading the media content to an end client device are lacking.

DETAILED DESCRIPTION

Figure 1:
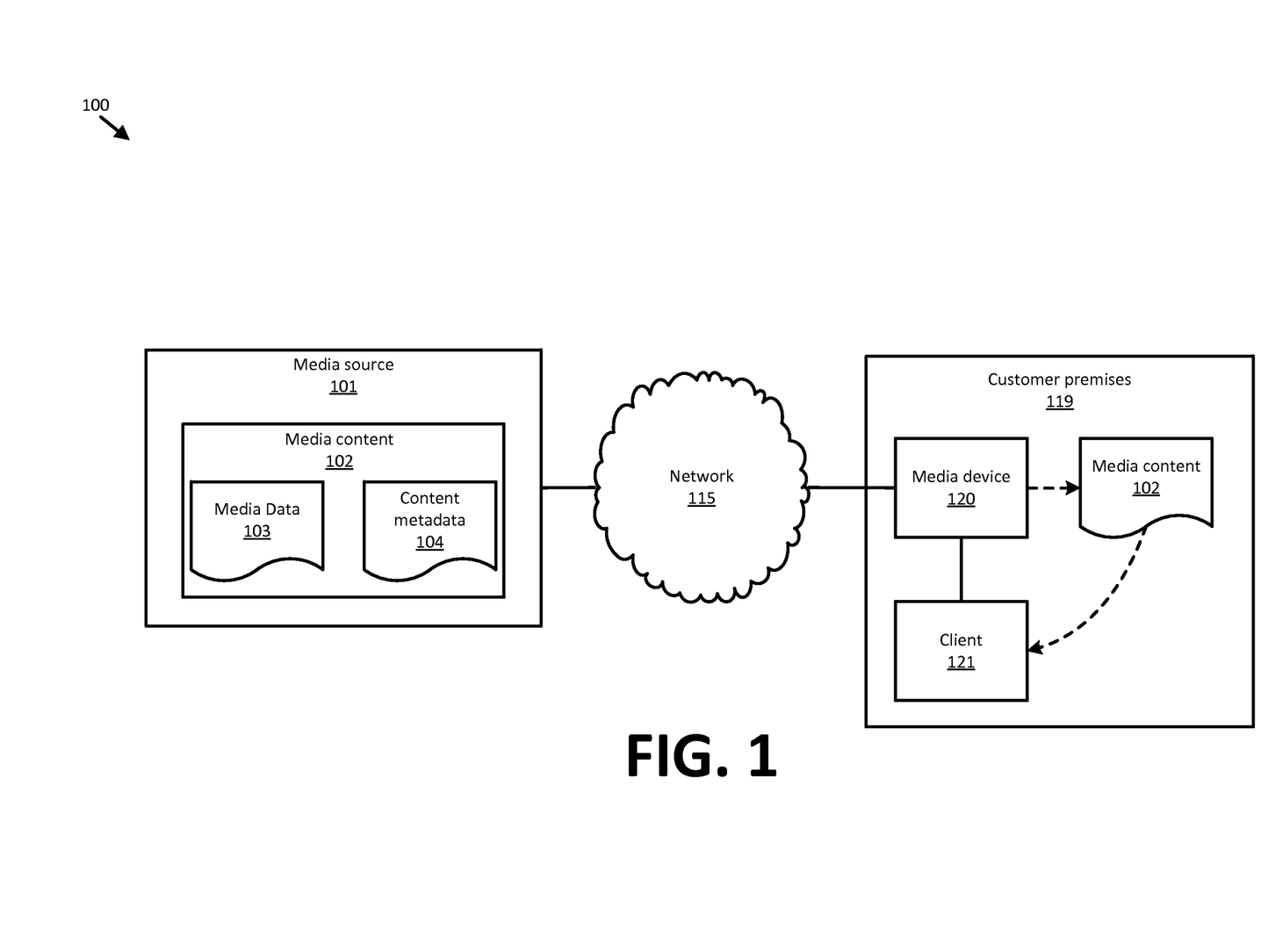
FIG. 1 is a block diagram of an exemplary media content delivery system.

FIG. 1 is a block diagram of an exemplary media content delivery system 100. A media source 101 in the system 100 includes media content 102, e.g., a video presentation such as a television program, e.g., a movie, sporting event, television show, etc. The media content 102 is generally provided via a network 115 to a media device 120. The media device 120 is generally located in a customer premises 119. Once downloaded to the media device 120 from the media source 101, media content 102 may be sideloaded, i.e., further transferred, to a client device 121. The present disclosure includes improved mechanisms for sideloading content 102 from a media device 120, e.g., a set-top box or the like, to a client 121, e.g., a portable computing device such as a tablet computer, smart phone, laptop computer, etc. The media content 102 may be then be displayed to a user via the client display device 121.

In general, a media source 101 may include multiple elements for processing, storing, and providing media content 102. Elements of the system 101 may be local to one another and/or may be distributed amongst multiple locations. For example, media source 101 may include computer servers and data storage devices, e.g., for storing and processing content 102 and other data such as discussed herein.

In general, the media source 101 may be any one or some combination of various mechanisms for delivering media content 102, e.g., one or more computing devices and storage devices, and may depend on a type of media content 102 being provided. By way of example and not limitation, media content 102 data may be provided as a broadcast, video-on-demand, etc., through a cable, satellite, or internet protocol television (IPTV) distribution system, as streaming Internet video data, or as some other kind of data. Accordingly, the media source 101 may include one or more of a cable or satellite television headend, a video streaming service such as generally includes a multimedia web server (or some other computing device), or some other mechanism for delivering multimedia data. In general, examples of media content 102 include various types of data, including audio, video, images, etc.

Communications to and from the media source 101 and customer premises 119. In general, the network 115 represents one or more mechanisms for delivering content 102 from the media source 101 to a media device 120. Accordingly, the network 115 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, etc.

Media content 102 is generally delivered via the network 115 in a digital format, e.g., as compressed audio and/or video data. The media content 102 generally includes, according to such digital format, media data 103 and content metadata 104. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content 102 may be provided in a format such as the MPEG-2 transport stream (TS) format, sometimes also referred to as MTS or MPEG-TS, or the H.264/MPEG-4 Advanced Video Coding standards (AVC) (H.264 and MPEG-4 at present being consistent), or according to some other standard or standards. For example, media content 102 could be audio data formatted according to standards such as MPEG-2 Audio Layer III (MP3), Advanced Audio Coding (AAC), etc. Further, the foregoing standards generally provide for including metadata, e.g. content metadata 104, along with media data 103, in a file of media content 102, such as the content metadata 104 discussed herein.

Media content 102 includes media content as it is usually provided for general distribution, e.g., a movie, television program, video file, audio file, etc. in a form has provided by a distributor of the media content 102. Alternatively or additionally, media content 102 may be modified from the form provided by a general distributor of content (e.g., recompressed, re-encoded, etc.). The media data 103 includes data by which a display, playback, representation, etc. of the media content 102 is presented on a media device 120 and/or display device 121. For example, media data 103 generally includes units of encoded and/or compressed video data, e.g., frames of an MPEG file or stream.

Content metadata 104 may include metadata as provided by an encoding standard such as an MPEG standard. Alternatively and/or additionally, content metadata 104 could be stored and/or provided separately to a media device 120, apart from media data 103. In general, content metadata 104 provides an index by which locations in the media data 103 may be identified, e.g., to support rewinding, fast forwarding, searching, pausing, resuming, etc. Metadata 104 may also include general descriptive information for an item of media content 102. Examples of content metadata 104 include information such as content 102 title, chapter, actor information, Motion Picture Association of America MPAA rating information, reviews, and other information that describes an item of media content 102.

In general, a media device 120 may download and store media content 102 according to a user request submitted through the media device 120, e.g., on demand, on a pre-program schedule, etc.

Turning to the customer premises 119, the media device 120 is generally a device including a computer processor and associated storage, e.g., volatile memory, non-volatile memory, etc., and capable of communicating via the network 115. Exemplary media devices 120 include a set-top box or the like. Further, the media device 120 may be connected to a client display device 121, e.g., a tablet computer, smart phone, or laptop computer. The content 102 may be transferred, i.e., sideloaded, from the media device 122 the client 121 for display. Such sideloading may be performed via a local area network, e.g., a wired or wireless, e.g., Wi-Fi, Bluetooth, etc., network in the customer premises 119. When content 102 is referred to herein as being "displayed," it is to be understood that such display could include any possible mode of displaying media data, such as a display of visual data, audio data, etc. For example, content 102, 125, etc. could be displayed by showing video or image data on a screen with or without sound, by playing audio data with or without a visual display, etc.

Figure 2:
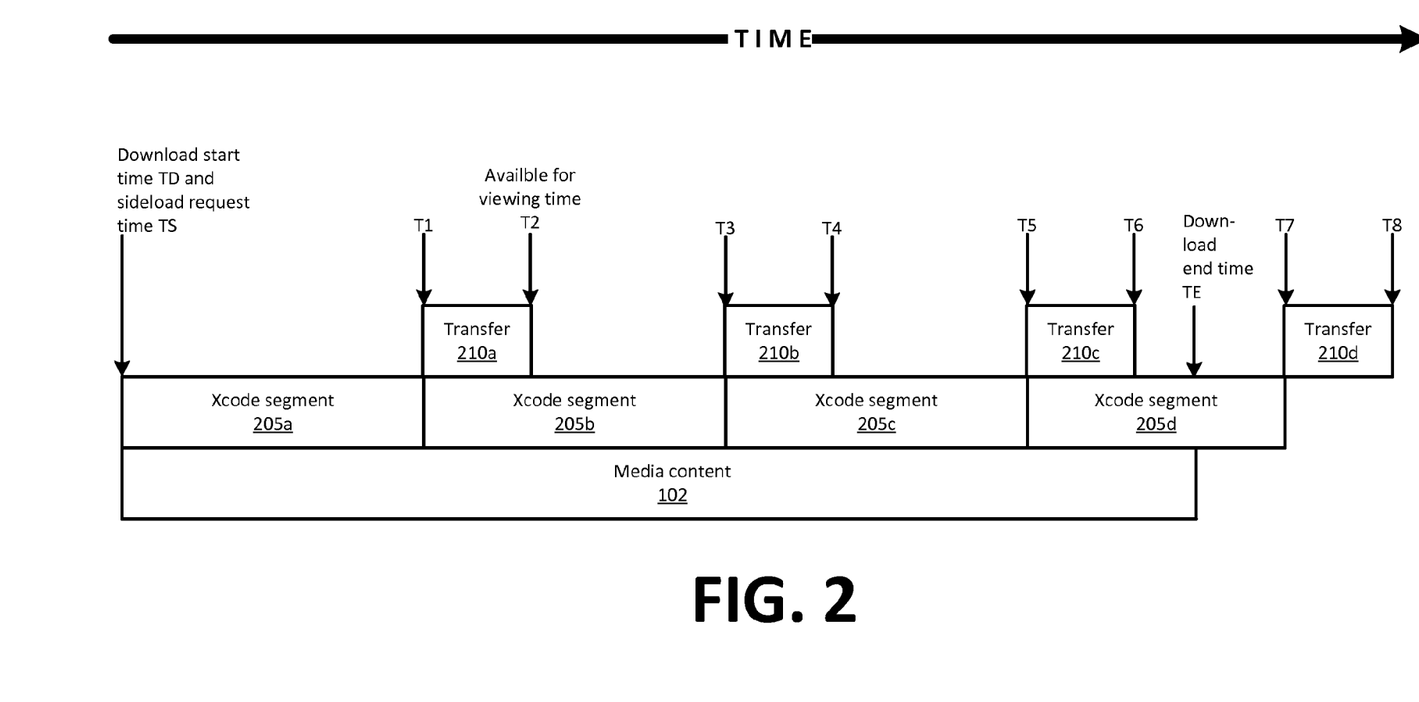
FIG. 2 is a block diagram of a first exemplary sideloading process.

FIG. 2 is a block diagram of a first exemplary sideloading process. As stated above, media data 103 is typically an encoded (e.g., MPEG-TS) video stream or file, e.g., a television program, video, etc., requested by a user of a media device 120. In the example of FIG. 2, it is assumed that a request to sideload content to a client device 121 has been received in the media device 120 at or, as is typically the case in the example of FIG. 2, prior to, initiation of a download of an item of media content 102 to the media device 120. (In the context of this disclosure, "download" includes the possibility of broadcasted content 102 that is recorded and saved in a memory, e.g., a storage mechanism, included in or attached to the media device 120.) Accordingly, in the example of FIG. 2, a download start time TD and a sideload request time TS are depicted as being a same time, although in most instances these times will in fact be different; FIG. 2 illustrates an example in which a sideload request time TS is made no later than the download start time TD.

Further, as seen in FIG. 2, because a sideload request, i.e., a request for media content 102 to be available for display on a client device 121, has been made at the time TD when download of media content 102 to a device 120 begins, transcoding of a segment 205*a* of the media content 102 can begin once the download has begun. That is, a client device 121 generally requires a format other than a download format of the media content 102, e.g., media content 102 may be downloaded in MPEG-TS format as stated above, but a client device 121 may require a format such as a MPEG-4, or MP4, HTTP Live Streaming (HLS) implemented by Apple, Inc., etc. for playback. (As is known, "HTTP" stands for hypertext transfer protocol.) Accordingly, a conversion process, such as is known, may be used to display the media content 102 for playback on the client device 121. The conversion process is sometimes referred to as "transcoding," which in the context of the present disclosure could include re-encoding content 102 with a different parameters, e.g., one or more of a different codec, bitrate, resolution etc., and/or re-packaging or re-multiplexing the content 102 to a different container format such as MP4, ASF etc. Then, once transcoding of the segment 205*a* is complete, at a time T1, the device 120 provides a transfer segment 210*a* to the client device 121. When the transfer 210*a* is complete at a time T2, the first transcoded segment 205*a* is available for viewing at the client device 121. Accordingly, the media content 102 is made available for display at the client device 121 at an earlier time than would otherwise be possible, e.g., if a download of media content 102 to the device 120 had to be complete before transcoding and transfer to the client 121 was commenced.

Continuing with the example of FIG. 2, once a second segment 205*b* of media content 102 is transcoded, a second transfer 210*b* begins at a time T3, and completes at a time T4, whereupon the second transcoded segment 205*b* is available for display at the client 121. Similarly, a transcoded segment 205*c* may be available at a time T5, whereupon a transfer 210*c* begins, the transfer 210*c* completing at a time T6, whereupon the third transcoded segment 205*c* of media content 102 is available for display on the client 121. Concluding the example of FIG. 2, a fourth transcoding segment 205*d* begins at the time T5, and concludes at a time T7. Further, between the times T5 and T7, download of the media content 102 to the device concludes at a time TE. Accordingly, the transfer 210*d* of media content 102 transcoding segment 205*d* that begins at the time T7, and ends at a time T8, concludes providing the downloaded item of media content 102 to the device 121 for display.

Figure 3:
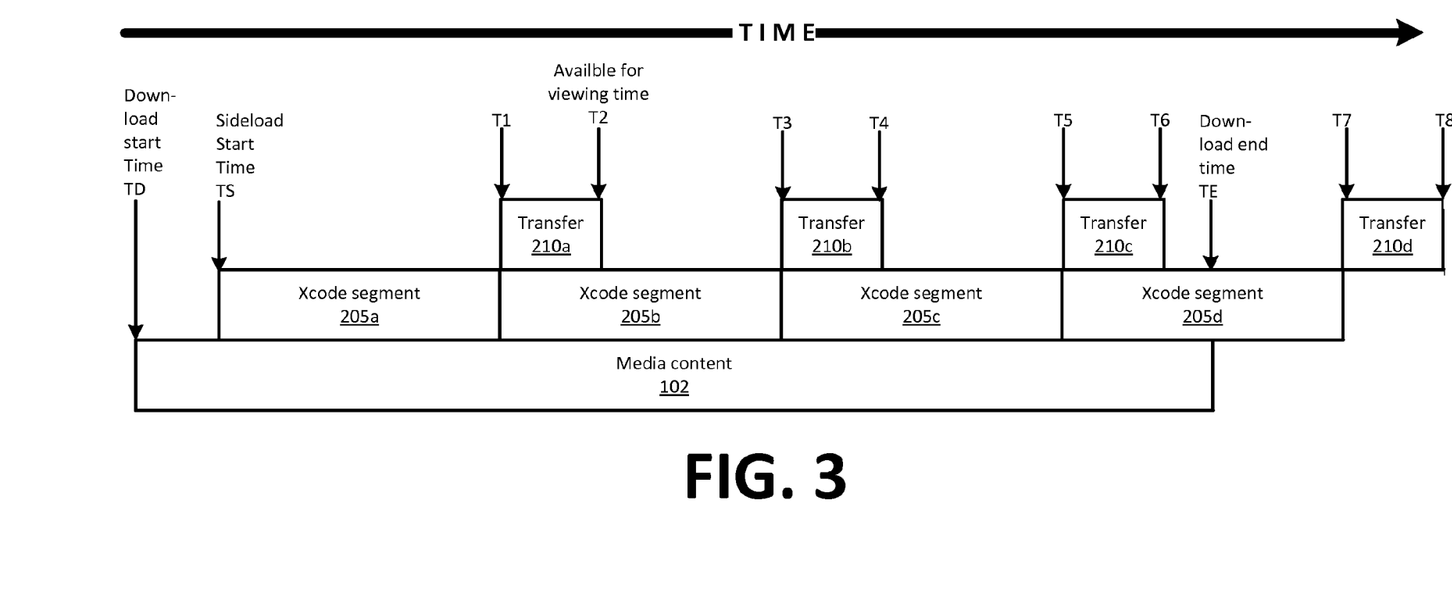
FIG. 3 is a block diagram of a second exemplary sideloading process.

FIG. 3 is a block diagram of a second exemplary sideloading process. FIG. 3 illustrates a scenario that varies from the scenario of FIG. 2 in that, in the example of FIG. 3, a download start time TD proceeds a sideload start time TS. That is, FIG. 3 covers a scenario in which a user requests sideloading of an item of media content 102 to a device 121 after the content 102 has begun downloading to a receiving device 120. In contrast, FIG. 2 relates to a scenario in which a sideload request is received at or before a time when download of media content 102 to a receiving device 120 begins. In any event, the example of FIG. 3 is otherwise similar to the example of FIG. 2. Transcode segments 205*a*-205*d* are provided for transfers, or sideloads, 210*a*-210*d*. An item of media content 102 may be displayed on a device 121 beginning at a time T2, and a complete item of media content 102 is available for display on a device 121 at a time T8.

Figure 4:
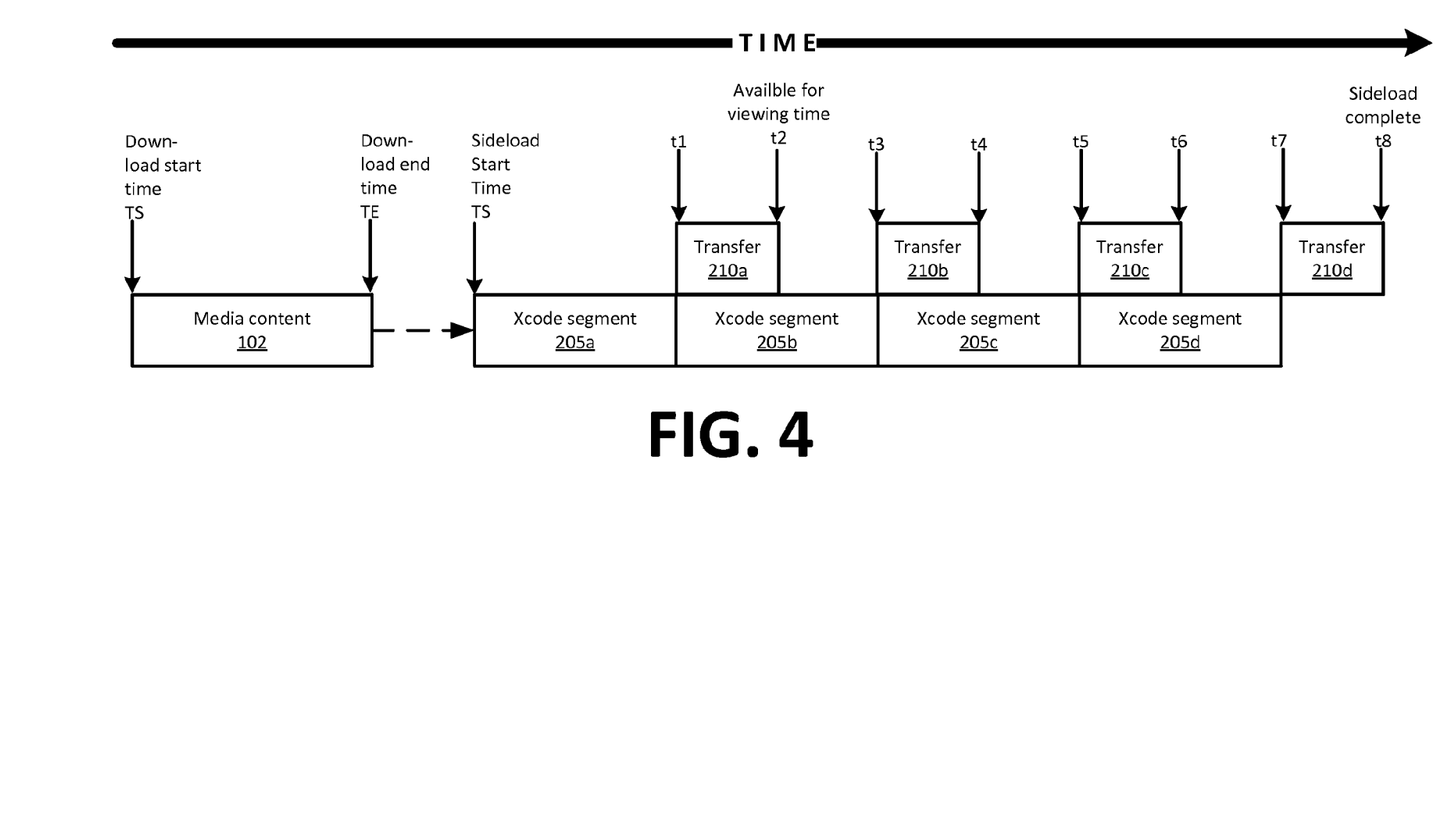
FIG. 4 is a block diagram of a third exemplary sideloading process.

FIG. 4 is a block diagram of a third exemplary sideloading process. The scenario illustrated in FIG. 4 assumes that an item of media content 102 has been completely downloaded to a receiving device 120 before a sideload to a client device 121 is requested, i.e., that both a download start time TS and a download and time TE proceed the sideload start time TS. Accordingly, the examples of FIGS. 2 and 3 are sometimes referred to as examples of "real-time" sideloading, because sideloading is performed while media content 102 is being downloaded and/or transcoded. In contrast, in the example of FIG. 4, a non-real-time process is described in that media content 102 download is complete before transcoding and/or sideloading begins. However, the example of FIG. 4 is otherwise similar to the examples of FIGS. 2 and 3. Transcode segments 205*a*-205*d* are provided for transfers, or sideloads, 210*a*-210*d*. An item of media content 102 may be displayed on a device 121 beginning at a time T2, and a complete item of media content 102 is available for display on a device 121 at a time T8.

With respect to all of the foregoing examples, it is to be understood that a number of segments 205 and transfers 210 illustrated in each example are purely for example, and not limitation. That is, an item of media content 102 could be broken into fewer than, or more likely, more than, the four segments 205 illustrated in each of the above-discussed figures. For example, a greater number of transcode segments 205 and transfers 210 may allow an item of media content 102 to be made available for display on a client device 121 earlier than a smaller number of segments 205 and transfers 210. That is, smaller segments 205 will result in a lower transfer 210 time duration, thereby making a first segment 205 available for display on the device 121 earlier than would be the case with a longer first segment 205.

Figure 5:
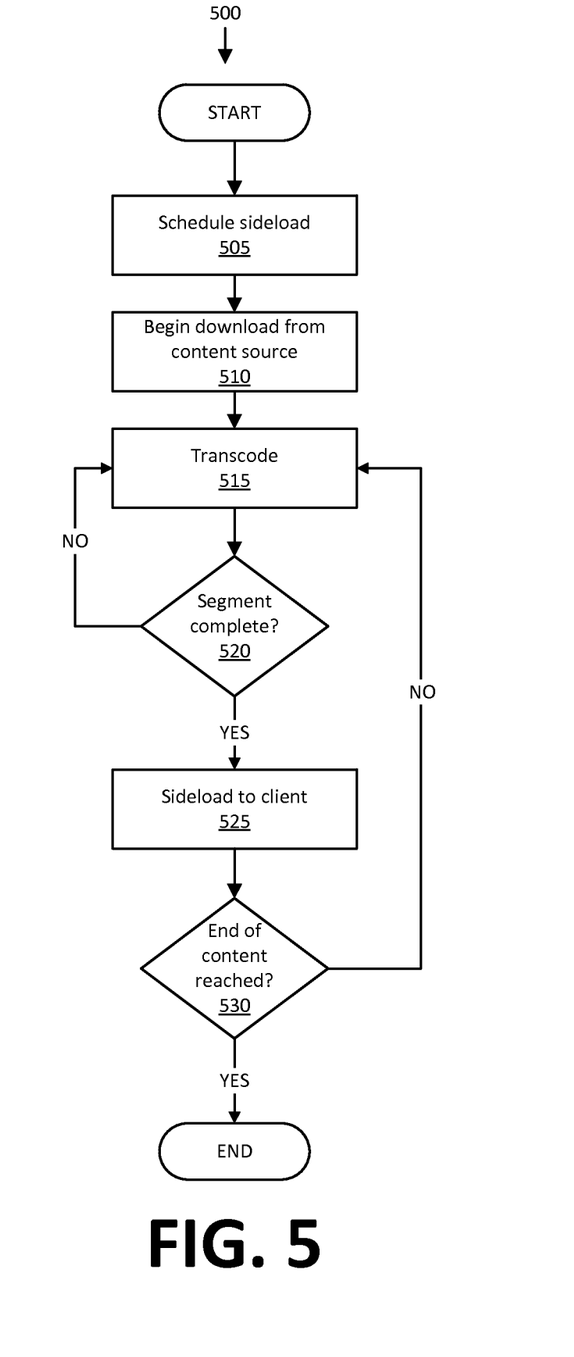
FIG. 5 is a process flow diagram of the first exemplary sideloading process illustrated in FIG. 2.

FIG. 5 is a process flow diagram of the first exemplary sideloading process illustrated in FIG. 2. Accordingly, FIG. 5 illustrates an exemplary process 500 that begins in a block 505, in which a receiving device 120 receives a request from a client device 121 to sideload an item of media content media content 102 that is to be downloaded to the receiving device 120 at a future time.

Following the block 505, in a block 510, at the download start time TD the receiving device 120 begins downloading the item of media content 102.

In a block 515, executed upon commencement of the block 510, the receiving device 120 begins transcoding a segment 205 of the media content 102.

Next, in a block 520, the device 120 determines whether the segment 205 for which transcoding was begun in the block 515 is complete. For example, a number of frames of media content 102, and elapsed time of media content 102, a percentage of media content 102, etc. could be used to determine a length of a segment 205, and whether a transcoded segment 205 was complete and ready for a transfer 210. Further, other considerations about an ending in the beginning point of a segment 205 may relate to characteristics of media data 103. For example, MPEG, as is known, includes various kinds of frames, including I-frames, B-frames, and P-frames. For example, because an MPEG I-frame, or "intra-frames" can, as is known, be decoded independently of any other frames in an MPEG stream, it may be desirable to begin and end segments 205 with I-frames. In any event, if the segment is not complete, then the process 500 returns to the block 515 to continue transcoding the segment 205. Otherwise, the process 500 proceeds to a block 525.

In the block 525, a transfer 210, i.e., a sideload to the requesting client 121, of the segment transcode as described above with respect to the blocks 515, 520, is performed.

Following the block 525, in a block 530, the device 120 determines whether an end of the media content 102 has been reached. That is, the device 120 determines whether the download and time TE occurred while the segment 205 transferred in the block 525 was being transcoded. If not, then the process 500 returns to the block 515 to transcode a next segment 205. Otherwise, the process 500 ends.

Figure 6:
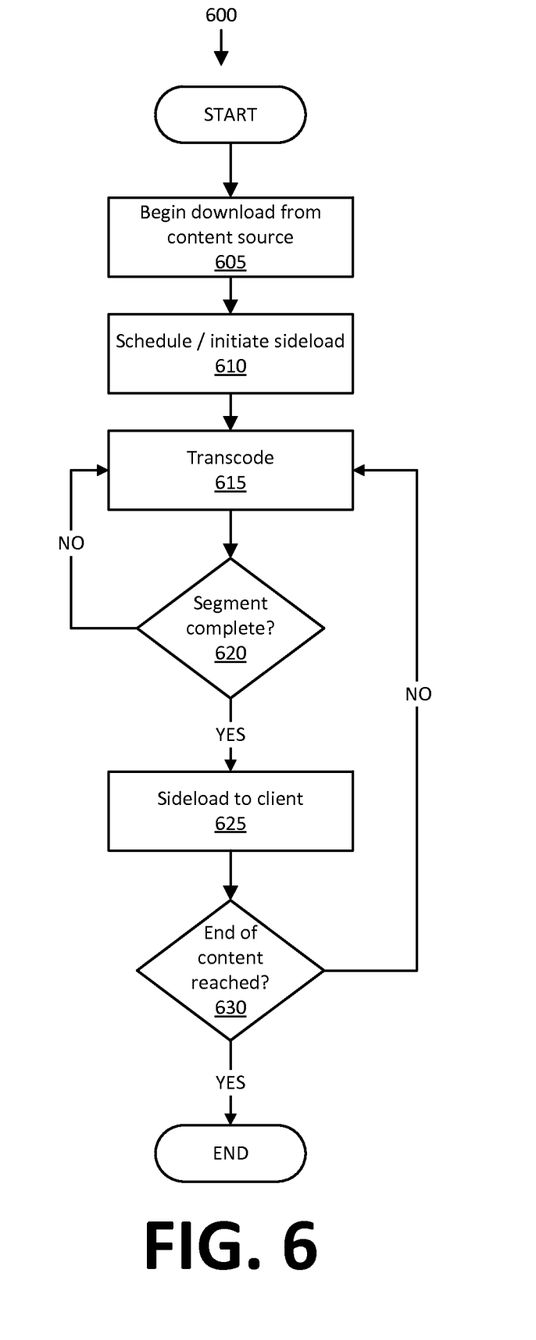
FIG. 6 is a process flow diagram of the second exemplary sideloading process illustrated in FIG. 3.

FIG. 6 is a process flow diagram of the second exemplary sideloading process illustrated in FIG. 3. Accordingly, FIG. 6 illustrates an exemplary process 600 that begins in a block 605, in which a receiving device 120 receives a request from a client device 121 to sideload an item of media content media content 102, the sideload request being received at a time TS that is after a download start time TD of a download of the media content item 102 to the receiving device 120, but before the download has ended.

Upon receiving the sideload request at the time TS in the block 605, the receiving device 120 then, in a block 610, generates a transcode segment 205 as discussed above. Further, blocks 615-630 are executed in a manner similar to the blocks 515-530 described above, and the process 600 may end after a block 630 much as the process 500 may end after the block 530, as described above.

Figure 7:
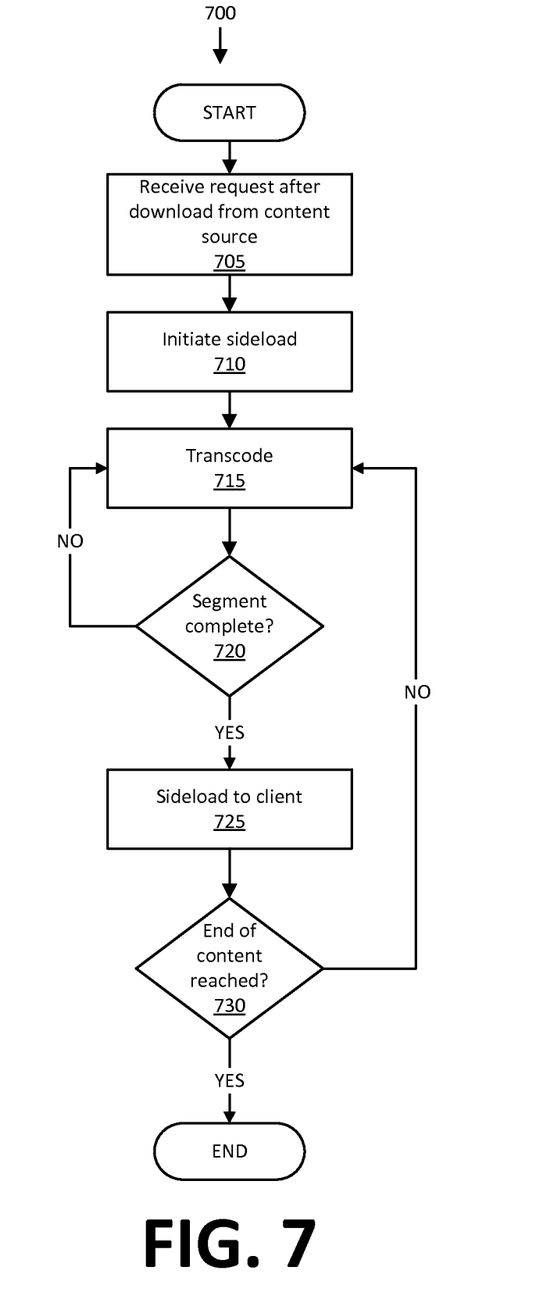
FIG. 7 is a process flow diagram of the first exemplary sideloading process illustrated in FIG. 4.

FIG. 7 is a process flow diagram of the third exemplary sideloading process illustrated in FIG. 4. Accordingly, FIG. 7 illustrates an exemplary process 700 that begins in a block 705, in which a receiving device 120 receives a request from a client device 121 to sideload an item of media content media content 102, the sideload request being received at a time TS that is after a download start time TD of download of the media content item 102 to the receiving device 120, and also after a download and time TE. Then in a block 710, the device 120 initiates a sideload of the media content 102 item, and then executes blocks 715-730 in a manner similar to the blocks 515-530 and 615-630 described above. Further, the process 700 may end after a block 730 much as the process 500 may end after the block 530, as described above.

Once an item of media content 102 is provided to a requesting client 121, e.g., according to any of the processes described above, the client 121 may include program instructions for displaying received segments 205. For example, the device 121 may include instructions for using media content 102 metadata included in each segment 205 to determine an order of the segments 205 and to transition from a first segment 205 to a second segment 205 in a manner that appears seamless to a user. For example, media content 102 metadata may include indexes or the like by which the device 121 can determine where to end a first segment 205 and where to begin a second segment 205 to provide a continuous, or at least a seemingly continuous, display of the media content 102. Accordingly, the client 121 could maintain a list of segments 205 in a fashion similar to the manner in which items of media content 102 could be maintained and organized in a playlist or the like for playback in a sequence.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a media device that includes a processor and a memory, the memory storing instructions executable by the processor, such that the media device is programmed to:
    download an item of media content from a remote source;
    receive a request from a client device for sideloading of the item of media content;
    begin sideloading of the item of media content to the client device, when the downloading has begun and the request has been received, and while the downloading is ongoing, by transcoding a first segment of the media content from a first format to a second format;
    determine a length of the first segment, wherein determining the first segment length includes using one or more metrics to determine whether the transcoding of the first segment is complete and the first segment is ready for transfer; and
    when the transcoding of the first segment is complete, and while the downloading remains ongoing, transfer the first segment to the client device, and begin transfer of the first segment to the client device, while transcoding a second segment of the item of media content.

2. The system of claim 1, wherein the first format is Motion Picture Experts Group Transport Stream (MPEG-TS) format, and the second format is one of Motion Picture Experts Group 4 (MP4) and HTTP Live Streaming (HLS).

3. The system of claim 1, wherein the media device is further programmed to receive the request before the downloading has begun.

4. The system of claim 1, wherein the media device is further programmed to receive the request after the downloading of the item of media content has been completed.

5. The system of claim 1, wherein the media device is further programmed to receive the request after the downloading of the item of media content has begun but before the downloading has been completed.

6. The system of claim 1, wherein the media device is a set-top box.

7. The system of claim 1, further comprising the client device, wherein the client device includes a processor and a memory, the memory storing instructions executable by the processor, such that the client device is programmed to receive a plurality of segments of the media content from the media device, and to display the segments.

8. A method, comprising:
    downloading an item of media content from a remote source;
    receiving a request from a client device for sideloading of the item of media content; and
    beginning sideloading of the item of media content to the client device, when the downloading has begun and the request has been received, and while the downloading is ongoing, by transcoding a first segment of the media content from a first format to a second format;
    determining a length of the first segment, wherein determining the first segment length includes using one or more metrics to determine whether the transcoding of the first segment is complete and the first segment is ready for transfer; and
    when the transcoding of the first segment is complete, and while the downloading remains ongoing, transferring the first segment to the client device, and beginning transfer of the first segment to the client device, while transcoding a second segment of the item of media content.

9. The method of claim 8, wherein the first format is Motion Picture Experts Group Transport Stream (MPEG-TS) format, and the second format is one of Motion Picture Experts Group 4 (MP4) and HTTP Live Streaming (HLS).

10. The method of claim 8, further comprising receiving the request before the downloading has begun.

11. The method of claim 8, further comprising receiving the request after the downloading of the item of media content has been completed.

12. The method of claim 8, further comprising receiving the request after the downloading of the item of media content has begun but before the downloading has been completed.

13. The method of claim 8, wherein the item of media content is downloaded to a set-top box.

14. The method of claim 8, further comprising receiving, in the client device, a plurality of segments of the media content, and displaying the segments.

15. The system of claim 1, wherein the one or more metrics include at least one of a number of frames of the segment, an elapsed time of the segment, and a percentage of the media content that the segment comprises.

16. The method of claim 8, wherein the one or more metrics include at least one of a number of frames of the segment, an elapsed time of the segment, and a percentage of the media content that the segment comprises.

* * * * *